United States Patent
Winter

(10) Patent No.: US 9,752,895 B2
(45) Date of Patent: Sep. 5, 2017

(54) METHODS AND SYSTEMS OF READING UTILITY METERS AND METHODS AND SYSTEMS OF TRANSMITTING UTILITY METER DATA

(71) Applicant: Nisko Telematics 2012 Limited Partnership, Tel-Aviv (IL)

(72) Inventor: Dan Winter, Pardesia (IL)

(73) Assignee: Nisko Telematics 2012 Limited Partnership, Tel-Aviv (IL)

( * ) Notice: Subject to any disclaimer, the term of this patent is extended or adjusted under 35 U.S.C. 154(b) by 33 days.

(21) Appl. No.: 14/360,628

(22) PCT Filed: Nov. 1, 2012

(86) PCT No.: PCT/IL2012/050436
§ 371 (c)(1),
(2) Date: May 26, 2014

(87) PCT Pub. No.: WO2013/076719
PCT Pub. Date: May 30, 2013

(65) Prior Publication Data
US 2014/0320306 A1 Oct. 30, 2014

Related U.S. Application Data

(60) Provisional application No. 61/563,573, filed on Nov. 24, 2011.

(51) Int. Cl.
*G08B 23/00* (2006.01)
*G08C 15/06* (2006.01)
*G01D 4/00* (2006.01)

(52) U.S. Cl.
CPC ............ *G01D 4/004* (2013.01); *Y02B 90/242* (2013.01); *Y04S 20/322* (2013.01)

(58) Field of Classification Search
CPC ...................................................... G01D 4/004
(Continued)

(56) References Cited

U.S. PATENT DOCUMENTS 7,353,121 B2 * 4/2008 Baraty ................... G06Q 30/08
702/187
2002/0094799 A1 * 7/2002 Elliott .................... G01D 4/002
455/405

(Continued)

FOREIGN PATENT DOCUMENTS

WO    WO 2013/076719    5/2013

OTHER PUBLICATIONS

International Preliminary Report on Patentability Dated Jul. 10, 2014 From the International Bureau of WIPO Re. Application No. PCT/IL2012/050436.

(Continued)

*Primary Examiner* — Amine Benlagsir

(57) ABSTRACT

A method of polling of meter data measured by a plurality of utility measuring devices and transmitted over a plurality of wireless local area network (WLAN) channels. The method comprises capturing a plurality of management frames which are transmitted periodically by a plurality of utility measuring devices over a plurality of WLAN channels, extracting meter data from each the management frame, and updating a plurality of consumer records, each according to respective the meter data from a respective the utility measuring device.

21 Claims, 3 Drawing Sheets

(58) Field of Classification Search
USPC .................................. 340/870.01, 870.02
See application file for complete search history.

(56) References Cited

U.S. PATENT DOCUMENTS

| | | | | |
|---|---|---|---|---|
| 2006/0103549 | A1* | 5/2006 | Hunt | G01D 4/004 340/870.02 |
| 2008/0220788 | A1* | 9/2008 | Stanwood | H04L 5/0007 455/450 |
| 2008/0270814 | A1* | 10/2008 | Starr | G06F 1/3203 713/323 |
| 2009/0115626 | A1* | 5/2009 | Vaswani | G01D 4/004 340/870.02 |
| 2009/0137247 | A1 | 5/2009 | Mok | |
| 2010/0188254 | A1* | 7/2010 | Johnson | H04W 36/30 340/870.02 |
| 2010/0188259 | A1 | 7/2010 | Johnson et al. | |
| 2010/0286937 | A1* | 11/2010 | Hedley | G06Q 30/02 702/60 |

OTHER PUBLICATIONS

International Search Report and the Written Opinion Dated Feb. 22, 2013 From the International Searching Authority Re. Application No. PCT/IL2012/050436.
Office Action Dated Jan. 15, 2017 From the Israel Patent Office Re. Application No. 232757 and Its Translation Into English. (16 Pages).

* cited by examiner

METHODS AND SYSTEMS OF READING UTILITY METERS AND METHODS AND SYSTEMS OF TRANSMITTING UTILITY METER DATA

FIELD AND BACKGROUND OF THE INVENTION

The present invention, in some embodiments thereof, relates to utility meters and, more particularly, but not exclusively, to methods and systems of reading utility meters and methods and systems of transmitting utility meter data.

Monitoring the residential, commercial, and industrial complexes of buildings throughout the United States is performed using a variety of user equipment. Examples of such user equipment include meter reading devices that measure consumption of various utility commodities such as natural gas, electricity and water via an electrical or electromechanical transducer.

In urban areas, the number of meter reading devices that need to be recorded is tremendous. Although the overhead associated with sending service personnel to a desired location can be amortized by consolidation of meter reading devices at a particular location, for example, in a high-density residential development such as an apartment complex, the cost can still be significant. In rural areas, however, the cost is higher as meter reading cannot generally be amortized over a number of meter reading devices read at a single location.

Various techniques are employed by utility companies to reduce the cost of sending service personnel to a physical site. For example, a simple method is the use of stochastic techniques for extrapolating a measured quantity for a current reading from one or more past values or a moving or seasonal average. This technique is designed to reduce the frequency of meter reading.

Another technique is the use of radio-based meter reading devices. For example, each meter reading device includes a radio, the radio capable of broadcasting a meter reading to a nearby receiver. The radio based meter reading devices allow service personnel to drive near the radio meter reading device with a receiver device to read the meter. With such technology service personnel do not need to enter the property. An advantage of such a system is that, in rural areas, the time it takes service personnel to read the meters can be reduced.

For example, one system might require service personnel to physically drive by or near a collection of meter reading devices in order to communicate with the devices. The data collected in the "drive-by" would be later uploaded to a centralized data collection system.

During the last years, a number of developments have been made to facilitate utility meter reading. U.S. Patent Application Pub. No. 2006/0044158 describes a secure automatic meter reading ("AMR") method and apparatus which utilizes a microprocessor and a bidirectional broadband connection to access the Internet and can form a wireless distribution network is provided. In addition to AMR, this connection and the network can provide high speed data transmission for other devices and services. As a result of the methods and apparatuses of the present inventions, legacy utility infrastructure and communications equipment can be integrated into a data transmission and collection network and remotely monitored without the costs associated with deploying service personnel or more costly equipment and services.

SUMMARY OF THE INVENTION

According to some embodiments of the present invention, there are provided methods and systems of polling of meter data measured by a plurality of utility measuring devices and transmitted over a plurality of wireless local area network (WLAN) channels. The method comprises capturing a plurality of management frames which are transmitted periodically by a plurality of utility measuring devices over a plurality of WLAN channels, extracting meter data from each the management frame, and updating a plurality of consumer records, each according to respective the meter data from a respective the utility measuring device.

Optionally, the capturing is performed without establishing a WLAN association with any of the utility measuring devices.

Optionally, the plurality of management frames are a plurality of probe request frames.

Optionally, the capturing by conveying a portable radio transceiver along a reading path.

Optionally, the extracting comprises extracting an identifier from each the management frame; wherein the updating comprises updating each one of the plurality of consumer records according to a match with a respective the identifier.

Optionally, the updating comprises forwarding the meter data to a management system over a network.

Optionally, the updating comprises identifying a resource provider associated with a respective the meter data and forwarding the respective meter data to a first of a plurality of management units; wherein the first management unit being associated with the resource provider.

According to some embodiments of the present invention, there are provided methods and systems of providing an interrogation device with meter data over a wireless local area network (WLAN) channel. The method comprises automatically receiving an meter data from at least one consumption reading unit, encoding the meter data in a management frame defined according to WLAN protocol, and transmitting the encoded meter data over a WLAN channel.

Optionally, the transmitting is performed without an identification of a recipient.

Optionally, the transmitting is repeated periodically.

Optionally, the method further comprises receiving an encoded management frame which comprises an encryption key over the WLAN channel; the encoding being performed according to the encryption key.

Optionally, the method further comprises receiving an encoded management frame which comprises a request for additional data over the WLAN channel; the encoding comprises encoding the additional data in the management frame.

More optionally, the transmitting is performed in response to the request.

According to some embodiments of the present invention, there are provided methods and systems of a utility measuring device. The utility comprises a power source, at least one consumption reading unit which measure consumption at least one resource and outputs meter data accordingly, a processing unit which encodes the meter data as information element of a management frame defined according to a wireless local area network (WLAN) protocol, and WLAN interface unit which periodically transmits the encoded meter data over a WLAN channel.

Optionally, the WLAN interface unit transmits the encoded meter data without an identification of a recipient.

Optionally, the at least one consumption reading unit is a member of a group consisting of a power meter, a solar meter, a fuel meter, a gas meter, and a renewable energy meter.

According to some embodiments of the present invention, there are provided methods and systems of monitoring a plurality of consumption reading units installed in a plurality of consumer sites. The system comprises a plurality of utility measuring devices each transmits meter data, acquired from at least one consumption reading unit, over a wireless local area network (WLAN) channel as an information element of a management frame, and an interrogation device which captures from each the utility measuring device a respective the management frame and updates a plurality of consumer records, each according to respective the meter data which is extracted from the respective management frame.

Optionally, the plurality of consumer records are managed by a management unit, the interrogation device extracts the meter data from the respective management frame and forwards the meter data over a network to the management unit.

Optionally, each the utility measuring device transmits respective the meter data without an identification of a recipient.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
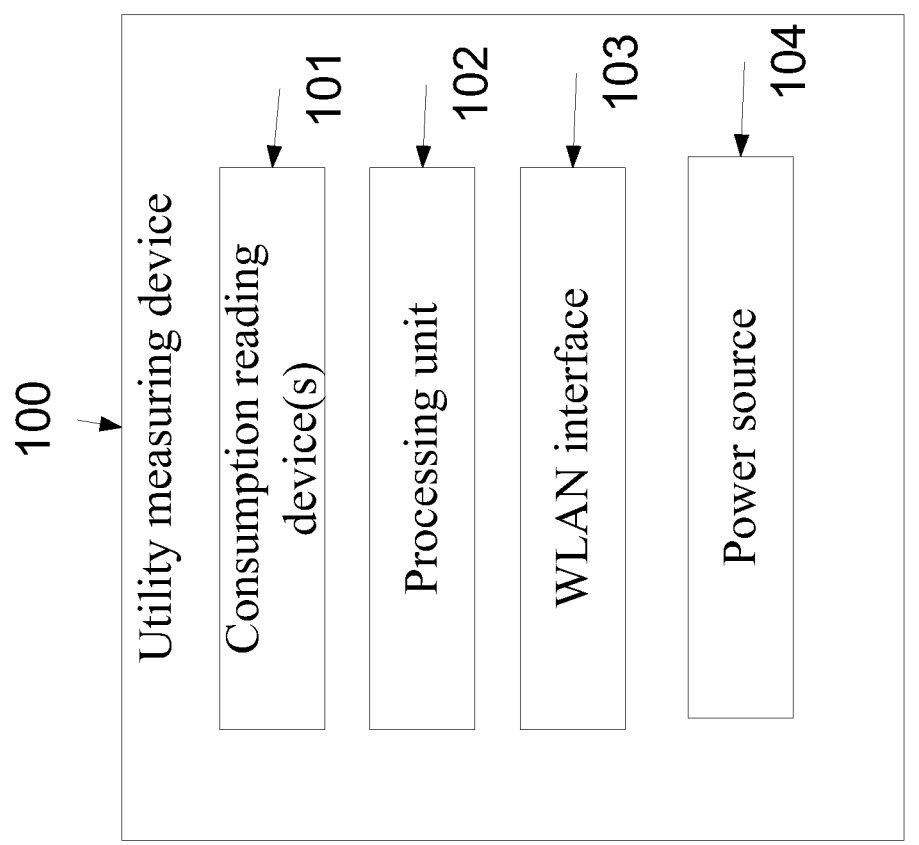
FIG. 1 is a block diagram of a utility measuring device capable of transmitting meter data in management frames defined by a wireless local area network (WLAN) protocol over a WLAN channel, according to some embodiments of the present invention.

The present invention, in some embodiments thereof, relates to utility meters and, more particularly, but not exclusively, to methods and systems of reading utility meters and methods and systems of transmitting utility meter data.

According to some embodiments of the present invention there are provided methods and systems of monitoring a plurality of resources, such as water, gas, and/or electricity, utilized in a plurality of consumer sites, by encoding meter data from consumption reading units in WLAN management frame(s), such as probe request frame(s), and transmitting the encoded meter data over WLAN channel(s). The transmission is optionally performed without establishing an association between the transmitter of the meter data and the recipient. As the meter data is encoded in WLAN management frames, for example according to 802.11x standards, the transmitting thereof requires minimal power. In such a manner, the battery lifespan of the utility measuring devices which are used to encode and transmit the meter data is increased.

An exemplary system includes a plurality of utility measuring devices each transmits meter data, acquired from one or more consumption reading units, over a WLAN channel as an information element of a management frame. The system further includes an interrogation device which extracts, for example decodes, meter data from a respective management frame of each utility measuring device and updates a plurality of consumer records according to the extracted meter data. The interrogation device optionally captures the meter data while performing walk-by, drive-by and/or fly-by meter reading.

According to some embodiments of the present invention, the utility measuring device automatically receives meter data from one or more consumption reading units, encodes the meter data in a management frame defined according to WLAN protocol, and transmits the encoded meter data over a WLAN channel. Optionally, the utility measuring device is set to receive instructions, commands, and/or operation data, such as an encryption key, over a WLAN channel without an association, for example encoded in management frame(s), such as probe response frames.

According to some embodiments of the present invention, the utility measuring device, which is optionally battery powered, includes or connected to one or more consumption reading units which measure consumption of one or more resources, such as water, electricity, and/or gas, and outputs meter data accordingly. The utility measuring device further includes a processing unit that encodes the meter data as information element of a management frame defined according to a WLAN protocol and a WLAN interface unit which periodically transmits the encoded meter data over a WLAN channel. In such a manner, the utility measuring device allows an interrogation unit to intercept the meter data without establishing WLAN association and/or identifying and/or authorizing the recipient.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a block diagram of a utility measuring device 100, also referred to herein as a utility meter 100, capable of transmitting meter data and optionally additional measured or monitored information, in management frames defined by a wireless local area network (WLAN) protocol over a WLAN channel, according to some embodiments of the present invention. A plurality of utility measuring devices 100 may be installed to monitor a plurality of separate households, businesses and/or any customer of a resource provider. The utility measuring device 100 comprises or connected to one or more monitoring and/or consumption reading unit(s) 101, such as automatic meter reading (AMR) devices 101, referred to herein reading device(s) 101 for example a power meter, a solar meter, a fuel meter, a gas meter, a renewable energy meter, a water meter and/or any measurement, tracking, and/or monitoring device. The consumption reading unit(s) 101 may be energy generation units, for example meter of a solar energy inverter system that locally generate electrical power and transfer it to the grid. The utility measuring equipment 100 further includes a processing unit 102 for processing outputs of the reading device 101 and a WLAN interface 103 that is optionally designed to communicate over WLAN channels, for example as described in any of the EEE. 802.11x standards, for example IEEE802.11A/b/g/n/I standards, which are incorporated herein by reference. The WLAN interface 103 functions as a WLAN station, for example as an access point (AP) or a client station (STA), for instance as described below.

The processing unit 102 and the WLAN interface 102 optionally includes or implemented as a serial to wireless (S2W) adaptor which converts a serial output of the consumption reading unit(s) 101 to data delivered in management frames defined by a WLAN protocol, for example as described below. Optionally, the processing unit 102 receives outputs of sensors which monitor the functioning of the consumption reading unit(s) 101. The utility measuring equipment 100 further includes a power source 104, which is optionally a long term battery.

Figure 2:
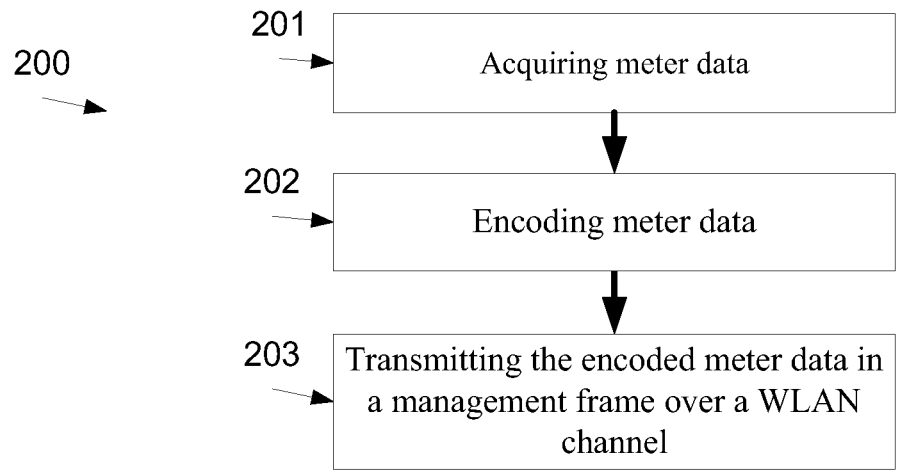
FIG. 2 is a flowchart of a method for transmitting meter data encoded in WLAN management frames to an interrogation device over a WLAN channel, according to some embodiments of the present invention.

Reference is also made to FIG. 2, which is a flowchart of a method 200 for transmitting meter data encoded in WLAN management frames to a stationary or mobile interrogation device over a WLAN channel, according to some embodiments of the present invention. The interrogation device may be implemented by a portable radio transceiver and computing unit, which are mounted in a vehicle and gather consumption and tamper data from utility measuring devices (endpoints) 100, for example electricity, gas and/or water radio-based utility measuring devices. Such an interrogation device is used for drive-by and/or fly-by meter reading, for example using an unmanned aerial vehicle (UAV). The interrogation device may be implemented as a handheld device that allows an operator to walk and/or drive therewith along a reading path. In such embodiment, the interrogation device automatically captures meter data, and optionally additional data, while strolling and/or driving along the path. The interrogation device may be a fixed device, such as a router, those polls for the meter data periodically, or upon request.

In such an embodiment, the method, which is optionally implemented by each utility measuring device 100, provides the interrogation device, which passes in proximity thereto, meter data and optionally additional data without requiring power consuming WLAN device association. It should be emphasized that reducing power consumption reduces the maintenance costs of utility measuring devices which are based on local power sources, for example batteries, as the frequency of replacing batteries and/or old utility measuring devices with new ones is reduced. The cost reduction is an outcome of less technician visits to the consumer site and/or less hardware expenditure per consumer site. Moreover, some utility measuring device 100 are designed to be water proof and a battery replace may harm their sealing level and increase their tendency to malfunction and reduce their lifespan.

First, as shown at 201, outputs of one or more reading devices 101, which monitor consumption of one or more utilities, such as electricity, gas, and water, are acquired, for example received by the processing unit 102 from the consumption reading unit(s) 101. This data may be referred to herein as meter data.

Now, as shown at 202, the received data is encoded for being transmitted in one or more management frames of a WLAN protocol, for example 802.11 protocol. Optionally, additional data is also encoded in the management frame(s). The encoding is optionally performed according to a key, for example, a default key or a key that is coordinated with the interrogation device, for example as described below.

Now, as shown at 203, the encoded data and optionally an ID of the utility measuring device 100 (or the respective subscriber), are transmitted over a WLAN channel to the interrogation device. Optionally, the meter data and an identification of the respective utility measuring device 100 is encoded and transmitted in a probe request frame. The probe request frame is a frame that is sent by the WLAN interface 102 when it functions as a station, according to the 802.11 protocol. According to the protocol, the transmission is performed periodically to trigger a probe response when the station needs to obtain information from another station. For example, the probe request frames are sent to determine which access points are within range. Optionally, the meter data is encoded as information element (IE) data, namely, within fields used to encode variable-length mandatory and all optional body components, as defined in IEEE802.11-2007 section 7.3, which is incorporated herein by reference. For example, the probe request frame is encoded with the meter data according to the following attention (AT) command:

AT+WVENDORIESET=<Enable/Disable> [, <Vendor IE ID>, <length>, <Data>]

where Enable/Disable denotes a binary flag to enable/disable encryption, <Vendor IE ID> denotes IE data identification (ID) in decimal, <Length> denotes the length of the encoded data in a decimal value, and <Data> denotes the encoded data, for example as a hexadecimal (hex) value. For example, the following is a respective AT command:

AT+WVENDORIESET=1,170,6,113355112233.

The probe request frame may be sent in response to the following AT command:

AT+WVENDORIESCAN=<Channel> where <Channel> denotes a channel on which the utility measuring device 100 sends the probe request frame. This command initiates a scan performed by sending a probe request frame. The scan time is optionally defined in a suitable AT command. As part of the scan response from WLAN channel, the S2W optionally receives only the probe response where the Vendor IE data ID is present. For example, the following is a respective AT command: AT+WVENDORIESCAN=11.

For example, the encryption on the WLAN interface is instructed according to the following AT command (should be provided before the probe request frame is encoded as described above):

---
AT+AVENDORIEENC=< Disable/Enable> [<Encryption algorithm>, <Key for Encryption>]
--- where <Enable/Disable> denotes a binary flag to enable/disable encryption, and <Key for Encryption> denotes a hexadecimal value having a max size of 32 byte indicative of Encryption key. For example, the encryption may be an RC4 encryption.

As the meter data is encoded in management frames, such as probe request frames which are transmitted in a pre-connect stage, when no actual association between the interrogation device and the utility measuring devices 100 is established, the battery power consumption is relatively low. In such a manner, the meter data, and optionally additional data, are transmitted with low power cost.

Figure 3:
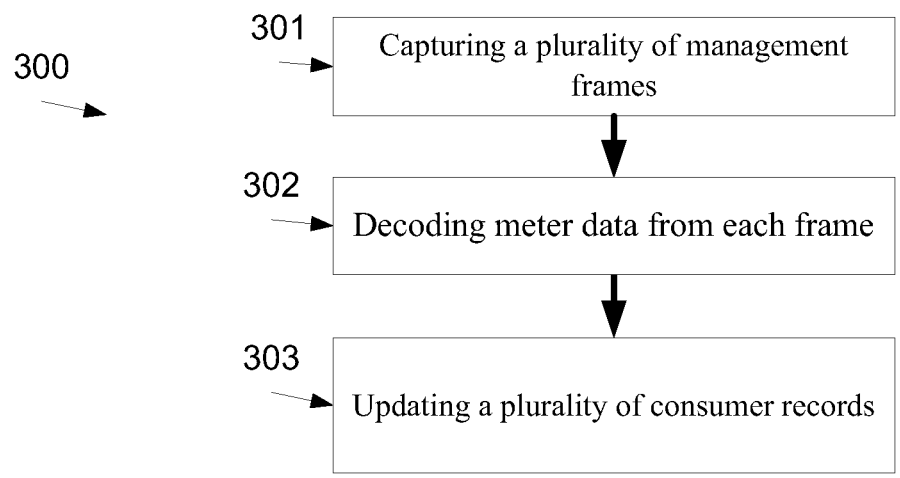
FIG. 3 is a flowchart of a method for polling reading data measured by a plurality of utility measuring devices and transmitted over WLAN channels, according to some embodiments of the present invention.

Reference is also made to FIG. 3, which is a flowchart 300 of a method for polling reading data measured by a plurality of utility measuring devices 100 and transmitted over WLAN channels, according to some embodiments of the present invention. The polling is optionally implemented by the interrogation device that optionally uses a WLAN interface for polling the plurality of utility measuring devices 100. Optionally, the interrogation device performs the polling while being transported along a meter reading path to perform a drive-by meter reading. In such an embodiment, the gathered meter data may be matched with a list of consumer sites from which meter data should be gathered in order to identify malfunctioning utility measuring devices 100 and/or to make sure that meter data from all the consumer sites along the meter reading path have been gathered and/or to instruct the carrier of the interrogation device to revisit one or more segments along the reading path.

First, as shown at 301, a plurality of management frames, such as probe request frames, which are transmitted by different utility measuring devices 100 over different WLAN channels, are captured, optionally sequentially, without establishing association. The capturing is optionally performed using a drive by, walk by, and/or fly by interrogation device, for example as described above.

As shown at 302, each one of the management frames is decoded to extract meter data, and optionally additional information, for example from IE data. This allows, as shown at 303, updating a plurality of consumer records, each according to respective meter data. For example, meter data extracted from a management frame having a service set identifier (SSID) "170" is identified as related to a subscriber which is associated with the SSID "170". Optionally, a hash table which coordinates between SSIDs and subscribers is provided at the interrogation device and/or in a management system that receives the data therefrom.

In such embodiments, as the management frames are encoded in WLAN management frames and transmitted over WLAN, the interrogation device may be implemented using available WLAN hardware, without any adaptation to a certain RF protocol. Such an interrogation device is not bound to a proprietary communication protocol of one meter manufacture or another but rather based on the WLAN protocol which is commonly used worldwide.

Optionally, the interrogation device sends to one or more of the utility measuring devices 100 commands which are encoded in management frames. For example, the command may include an encryption key to use and/or instructions to coordinate encryption. Other commands may be change key commands, reset commands and/or sleep commands.

Optionally, the interrogation device participates in a bidirectional session with each one of at least some of the utility measuring devices 100. During the bidirectional session, data, for example requests and/or responses, is encoded in management frames which are transmitted over a WLAN channel. For example, the requests may be for battery status, malfunction logs, and/or providing current settings.

The requests and/or commands, which are sent by the interrogation device, are optionally encoded in management frames and transmitted with an association with the utility measuring devices 100. For example, the commands and/or requests are encoded by the interrogation device in a probe response frame that is sent from the WLAN interface of the interrogation device after receiving a probe request frame. The probe response frame is optionally defined according the following AT command:

---
AT+WVENDORIERSP= <No Probe Response/Send Probe Response> [, <MAC>, <Rate>, <Vendor IE ID>, Length, <DATA>]
--- where <No Probe Response/Send Probe Response> denotes a binary flag to send/no send a probe response, <MAC> denotes a MAC address of the client, the utility measuring device 100, in a xx:xx:xx:xx:xx:xx format, <rate> denotes rate at which the probe response is transmitted, <Vendor IE ID> is the IE data ID, <Length> denotes IE data length in a decimal value, <DATA> denotes a command and/or a request in a hexadecimal value, and <Vendor IE ID> denotes IE data as a decimal value. This command and/or request is sent as a response to the utility measuring device 100 which sent the probe request frame with a specific IE. If encryption is enabled, the command is encrypted. For example, the following is a respective AT command: AT+WVENDORIERSP=1,00:1d:c9:01:99:99,2, 170,6,998877665544

It should be noted that valid rates are 2 for 1 megabytes per second (mbps), 4 for 2 mbps, 11 for 5.5 mbps, and 22 for 11 mbps.

Figure 4:
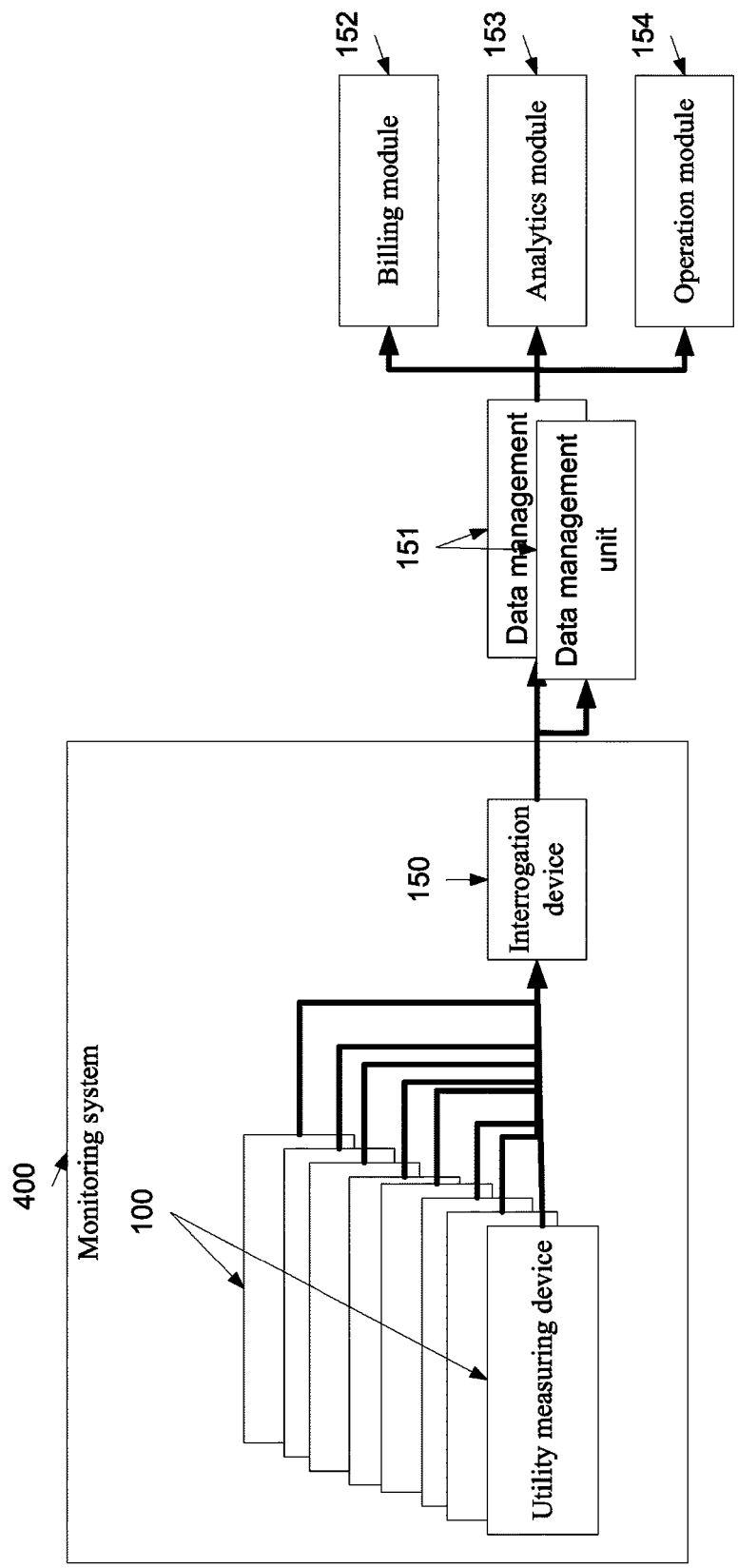
FIG. 4 is a schematic illustration of units involved in an optional flow of data emanated from the utility measuring devices, according to some embodiments of the present invention.

As the utility measuring devices 100 and the interrogation device respectively encode and transmit meter data and requests and/or commands in management frames, the bidirectional communication therebetween does not require association. In such a manner, the power consumption of the bidirectional communication is relatively low. Reference is now also made to FIG. 4, which is a schematic illustration a monitoring system 400 of monitoring a plurality of consumption reading units installed in a plurality of consumer sites, such as households and businesses, an optional flow of data emanated from the utility measuring devices 100 in the system 400 to external units, and the external units, according to some embodiments of the present invention. The management frames, which are transmitted from the utility measuring devices 100, as described above, are captured by an interrogation device 150. The interrogation device 150 forwards the acquired data to a remote meter data management unit 151, which is optionally a network node, such as a server, either as encrypted or decrypted data. The data management unit 151 comprises or connected to a repository which hosts the meter data.

According to some embodiments of the present invention, interrogation device 150 transfers meter data to a number of different data management units 151, each of another resource provider. Optionally, the interrogation device 150, for example the processing unit 102 thereof, identifies the resource provider of the consumer site from which the meter data is acquired, for example according to the ID that is encoded in the management frame. This allows the interrogation device 150 to transmit the meter data directly to the data management unit 151 of the respective resource provider. In such embodiments, a single interrogation device 150, optionally vehicle mounted, may be used for providing meter data to a number of different resource providers, for example different gas suppliers and/or gas supplier and electricity supplier. For example, while being transported along a reading path, meter data pertaining to consumer sites which receive services from different resource providers may be gathered and forwarded to different service providers.

Each data management unit 151 optionally distributes the meter data or derivatives thereof to update billing, analytics and/or operation modules 152-154 based on the acquired data. The analytics module 153 is optionally designed to analyze meter data received from a plurality of utility measuring devices 100 for identifying a local or a general malfunction. For example, if the meter data is indicative of water consumption, a statistical analysis of current and past consumptions in a certain area may be used to identify leaks in a water system or in a gas system, electricity thefts, and reduction in the production of a renewable energy source and/or the like. In another example, statistical analysis may be used for managing maintenance and monitoring fire hydrants pressure and/or flow of water, fuel and/or gas, waste water management, and/or non-revenue water, all depends on the nature of the meter data, for example as described above. The analytics module 153 is optionally designed to analyze meter data recorded long periods, for example a number of weeks, months, and/or years to identify consumption patterns and/or changes, implications of urban changes, and/or the like.

According to some embodiments of the present invention, the interrogation device 150 functions as a gateway, optionally mobile, that captures meter data and forwards it, optionally immediately, to the remote meter data management system 151. The forwarding is optionally performed over the internet and/or any other data network, for example a cellular network. In such an embodiment, the remote meter data management system 151 updates records in real time and may use the data for instructing the carrier of the interrogation device 150 during his navigation along a reading path, for example update the reading path or asking the carrier to repeat a certain segment of the reading path as some meter data is missing.

It is expected that during the life of a patent maturing from this application many relevant methods and systems will be developed and the scope of the term gauge, AMR device, WLAN, and computing unit is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method of polling of meter data measured by a plurality of utility measuring devices and transmitted over a plurality of wireless local area network (WLAN) channels, comprising:
   capturing a plurality of frames of a WLAN protocol which are transmitted periodically by the plurality of utility measuring devices over the plurality of WLAN channels, said plurality of frames are of a type of Management Frames,
   wherein a format of said plurality of frames is defined according to said WLAN protocol for communication before a WLAN association with an interrogation device is established,
   wherein each of said plurality of frames contains meter data of respective each of said plurality of utility measuring devices embedded in an Information Element (IE) field of said plurality of frames, wherein said plurality of frames are of the type of the Management Frames, said IE field and said Management Frames are defined according to said WLAN protocol, and
   wherein said transmission periodically by the plurality of utility measuring devices is conducted without establishing the WLAN association with the interrogation device;
   extracting said meter data from said each of said plurality of frames; and
   updating a plurality of consumer records, each one of the consumer records according to respective said meter data from the respective said each of said plurality of utility measuring device.

2. The method of claim 1, wherein said capturing is further performed without establishing the WLAN association with any of said plurality of utility measuring devices.

3. The method of claim 1, wherein said plurality of frames is a plurality of probe request frames.

4. The method of claim 1, wherein said capturing is further performed by conveying a portable radio transceiver along a reading path.

5. The method of claim 1, wherein said extracting further comprises extracting an identifier from said each of said plurality of frames; wherein said updating further comprises updating said each one of said plurality of consumer records according to a match with a respective said identifier.

6. The method of claim 1, wherein said updating further comprises forwarding said meter data to a management system over a network.

7. The method of claim 1, wherein said updating further comprises identifying a resource provider associated with the respective said meter data and forwarding said respective meter data to a first management unit of a plurality of management units; wherein said first management unit being associated with said resource provider.

8. The method of claim 7, wherein said updating is further performed in real time.

9. A method of providing an interrogation device with meter data over a wireless local area network (WLAN) channel of a plurality of WLAN channels, comprising:
   automatically receiving the meter data from at least one consumption reading unit of a plurality of consumption reading units, wherein the meter data is transmitted periodically by said at least one consumption reading unit over the plurality of WLAN channels;
   encoding said meter data to embedded meter data in an information element (IE) field of a frame, wherein the frame is of a type of Management Frame of a WLAN protocol,
   wherein a format of the frame in said IE and said Management Frame is defined according to said WLAN protocol;
   and wherein said frame is defined according to said WLAN protocol for communication before a WLAN association with the interrogation device is established; and
   transmitting said frame containing said encoded meter data over the WLAN channel without establishing the WLAN association with the interrogation device;
   extracting said encoded meter data from said frame; and
   updating a plurality of consumer records, each one of the consumer records according to respective said encoded meter data from respective each of said plurality of consumption reading units.

10. The method of claim 9, wherein said transmitting is further performed without an identification of a recipient.

11. The method of claim 9, wherein said transmitting is further repeated periodically.

12. The method of claim 9, further comprising receiving an encoded management frame which comprises an encryption key over said WLAN channel; said encoding said meter data being further performed according to said encryption key.

13. The method of claim 9, further comprising receiving an encoded WLAN management frame which comprises a request for additional data over said WLAN channel; said encoding said meter data further comprises encoding said additional data as information element in said WLAN management frame.

14. The method of claim 13, wherein said transmitting is further performed in response to said request.

15. A utility measuring device, comprising:
   a power source;
   at least one consumption reading unit of a plurality of consumption reading units which measures consumption of at least one resource and outputs meter data accordingly;
   a processing unit which encodes said meter data in a dedicated Information Element (IE) field of a frame, wherein the frame is of a type of Management Frame of a wireless local area network (WLAN) protocol, wherein a format of the frame in said Information Element field and said Management Frame is defined according to said WLAN protocol, and wherein said frame is defined according to said WLAN protocol for communication before a WLAN association with an interrogation device is established; and WLAN interface unit which periodically transmits said encoded meter data over a WLAN channel without establishing the WLAN association with the interrogation device, wherein extracting said encoded meter data from said frame; and updating a plurality of consumer records, each one of the consumer records according to respective said encoded meter data from a respective each of said plurality of consumption reading units.

16. The utility measuring device of claim 15, wherein said WLAN interface unit further transmits said encoded meter data without an identification of a recipient.

17. The utility measuring device of claim 15, wherein said at least one consumption reading unit is a member of a group consisting of a power meter, a solar meter, a fuel meter, a gas meter, and a renewable energy meter.

18. The utility measuring device of claim 15, wherein said processing unit is further configured to receive at least one member of a group consisting of instructions, commands, and operation data, over said WLAN channel without the WLAN association with said interrogation device.

19. A system of monitoring a plurality of consumption reading units installed in a plurality of consumer sites, comprising:

a plurality of utility measuring devices, each of the utility measuring devices transmits meter data, acquired from at least one consumption reading unit of the consumption reading units, over a wireless local area network (WLAN) channel, said meter data is encoded in a dedicated Information Element (IE) field of a respective frame, wherein the respective frame is of a type of Management Frame of said WLAN protocol; and an interrogation device which captures from said each utility measuring device of the utility measuring devices said respective frame and updates a plurality of consumer records, each of the plurality of consumer records according to respective said meter data which is extracted from said respective frame;

wherein a format of said respective frame is in the Information Element and said Management Frame is defined according to said WLAN protocol for communication before a WLAN association is established, and wherein said plurality of utility measuring devices transmit said meter data without establishing the WLAN association with said interrogation device.

20. The system of claim 19, wherein said plurality of consumer records are managed by a management unit, said interrogation device further extracts said meter data from said respective frame and forwards said meter data over a network to said management unit.

21. The system of claim 19, wherein said each utility measuring device further transmits respective said meter data without an identification of a recipient.

* * * * *